(12) United States Patent
Nelson et al.

(10) Patent No.: US 9,860,570 B2
(45) Date of Patent: Jan. 2, 2018

(54) METHODS, APPARATUS, AND ARTICLES OF MANUFACTURE TO IDENTIFY MEDIA DELIVERY

(71) Applicant: The Nielsen Company (US), LLC, New York, NY (US)

(72) Inventors: Daniel Nelson, Tampa, FL (US); Alan Nguyen Bosworth, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/250,170

(22) Filed: Aug. 29, 2016

(65) Prior Publication Data

US 2016/0366451 A1 Dec. 15, 2016

Related U.S. Application Data

(63) Continuation of application No. 13/446,867, filed on Apr. 13, 2012, now Pat. No. 9,438,965.

(51) Int. Cl.
*H04N 21/234* (2011.01)
*H04N 21/81* (2011.01)
(Continued)

(52) U.S. Cl.
CPC . *H04N 21/23418* (2013.01); *H04N 21/44222* (2013.01); *H04N 21/47202* (2013.01); *H04N 21/8133* (2013.01)

(58) Field of Classification Search
None
See application file for complete search history.

(56) References Cited

U.S. PATENT DOCUMENTS 6,529,952 B1 * 3/2003 Blumenau ........... G06F 17/3089
707/E17.116
7,373,415 B1 * 5/2008 DeShan .............. H04L 65/4076
709/231

(Continued)

OTHER PUBLICATIONS

United States Patent and Trademark Office, "Final Office Action," issued in connection with U.S. Appl. No. 13/446,867, dated May 18, 2015, 13 pages.

(Continued)

*Primary Examiner* — William J. Goodchild
(74) *Attorney, Agent, or Firm* — Hanley, Flight & Zimmerman, LLC

(57) ABSTRACT

Methods, apparatus, and articles of manufacture to identify media delivery are disclosed. An example method includes providing a monitor to a media presentation device after a selection of a user as a panel member, the monitor to generate a log entry including first source address information, first destination address information, first source port information, first destination port information, and media identification information associated with a media receiving event. Processing a first log file received from the monitor that includes the log entry. Determining if the log entry corresponds to a reference log entry from a media provider. And in response to detecting the corresponding reference log entry, storing the media identification information from the log entry in association with the monitor and generating an exposure report that associates media identified in the media information with the media provider that provided the media to the media presentation device.

20 Claims, 9 Drawing Sheets

(51) Int. Cl.
*H04N 21/442* (2011.01)
*H04N 21/472* (2011.01)

(56) References Cited

U.S. PATENT DOCUMENTS

| | | | |
|---|---|---|---|
| 8,037,175 B1 * | 10/2011 | Apte | H04L 43/028 |
| | | | 370/230.1 |
| 9,438,965 B2 | 9/2016 | Nelson et al. | |
| 2003/0093783 A1 * | 5/2003 | Nelson | H04H 60/40 |
| | | | 725/9 |
| 2005/0216898 A1 * | 9/2005 | Powell | G06F 8/36 |
| | | | 717/141 |
| 2005/0267750 A1 * | 12/2005 | Steuer | H04H 60/37 |
| | | | 704/231 |
| 2007/0220605 A1 * | 9/2007 | Chien | G06F 21/552 |
| | | | 726/23 |
| 2013/0276129 A1 | 10/2013 | Nelson et al. | |

OTHER PUBLICATIONS

United States Patent and Trademark Office, "Non-Final Office Action," issued in connection with U.S. Appl. No. 13/446,867, dated Dec. 4, 2014, 10 pages.
United States Patent and Trademark Office, "Non-Final Office Action," issued in connection with U.S. Appl. No. 13/446,867, dated Jan. 4, 2016, 14 pages.
United States Patent and Trademark Office, "Notice of Allowance," issued in connection with U.S. Appl. No. 13/446,867, dated May 6, 2016, 5 pages.
United States Patent and Trademark Office, "Pre-Brief Appeal Conference Decision," issued in connection with U.S. Appl. No. 13/446,867, dated Oct. 7, 2015, 2 pages.

* cited by examiner

| | SOURCE IP | DEST IP | SOURCE PORT | DEST PORT | TIMESTAMP | CONTENT ID |
|---|---|---|---|---|---|---|
| 502a → | 208.111.173.130 | 225.30.180.185 | 8080 | 10070 | 03012012:22:35:43 | 94739204 |
| 502b → | 208.111.173.130 | 20.209.152.6 | 8080 | 10071 | 03012012:22:36:34 | 856202047 |
| 502c → | 208.111.173.130 | 168.254.52.101 | 8080 | 10070 | 03012012:22:37:15 | 382047563 |
| 502d → | 208.111.173.130 | 13.40.159.94 | 8080 | 10073 | 03012012:22:39:04 | 39475639 |
| 502e → | 208.111.173.130 | 9.26.243.211 | 8080 | 10075 | 03012012:22:40:32 | 49583650 |
| 502f → | 208.111.173.130 | 147.106.124.1 | 8080 | 10073 | 03012012:22:49:29 | 930284673 |
| 502g → | 208.111.173.130 | 67.162.196.169 | 8080 | 10078 | 03012012:22:50:43 | 495730958 |
| 502h → | 208.111.173.130 | 69.208.7.40 | 8080 | 10079 | 03012012:22:52:48 | 37290473 |
| 502i → | 208.111.173.130 | 237.187.224.3 | 8080 | 10080 | 03012012:22:54:23 | 49205634 |
| 502j → | 208.111.173.130 | 141.121.8.55 | 8080 | 10073 | 03012012:22:55:37 | 24134927 |
| 502k → | 208.111.173.130 | 121.59.156.133 | 8080 | 10074 | 03012012:22:58:14 | 593057835 |
| 502l → | 208.111.173.130 | 99.60.226.107 | 8080 | 10080 | 03012012:23:01:00 | 583046201 |
| | 504 | 506 | 508 | 510 | 512 | 514 |

PROVIDER ID: NFLIX — 516

500

614 — DEVICE ID: IP49202D84H
616 — DEVICE TYPE: IPAD232GBWIFI
618 — MONITOR ID: 478967645

600

| | SOURCE IP | DEST IP | SOURCE PORT | DEST PORT | TIMESTAMP |
|---|---|---|---|---|---|
| 602a → | 208.111.173.130 | 245.98.49.75 | 8080 | 10070 | 02272012:12:34:56 |
| 602b → | 208.111.173.130 | 245.98.49.75 | 8080 | 10071 | 02272012:15:37:26 |
| 602c → | 208.111.173.130 | 245.98.49.75 | 8080 | 10070 | 02282012:08:10:32 |
| 602d → | 208.111.173.130 | 245.98.49.75 | 8080 | 10073 | 02282012:10:52:18 |
| 602e → | 82.94.229.16 | 245.98.49.75 | 8080 | 1935 | 02282012:17:02:08 |
| 602f → | 82.94.229.16 | 245.98.49.75 | 8080 | 1935 | 02282012:18:30:10 |
| 602g → | 208.111.173.130 | 245.98.156.12 | 8080 | 10078 | 03012012:22:50:43 |
| 602h → | 82.94.229.16 | 245.98.156.12 | 8080 | 1935 | 03012012:23:00:08 |
| 602i → | 208.111.173.130 | 245.98.156.12 | 8080 | 10080 | 03022012:12:54:23 |
| 602j → | 82.94.229.16 | 245.98.156.12 | 8080 | 1935 | 03022012:13:55:37 |
| 602k → | 208.111.173.130 | 245.98.156.12 | 8080 | 10074 | 03032012:09:58:14 |
| 602l → | 82.94.229.16 | 245.98.156.12 | 8080 | 1935 | 03032012:10:11:17 |
| | 604 | 606 | 608 | 610 | 612 |

| | DEVICE ID | DEVICE TYPE | MONITOR ID | CONTENT ID | PROVIDER | TIMESTAMP |
|---|---|---|---|---|---|---|
| 702a → | IP49202D84H | IPAD232GBWIFI | 478967645 | 930579 | NFLIX | 02272012:12:34:56 |
| 702b → | IP46434D82H | IPAD264GBWIFI | 48694893 | 38503 | PDORA | 02272012:14:37:46 |
| 702c → | IP49202D80H | IPAD216GB3G | 897463874 | 603894 | NFLIX | 02282012:07:13:30 |
| 702d → | MX3940493 | MOTOXOOM32G | 45489319 | 483905 | HULU | 02282012:10:52:18 |
| 702e → | IP49202D84H | IPAD232GBWIFI | 478967645 | 3834 | NFLIX | 02282012:17:02:08 |
| | 704 | 706 | 708 | 710 | 712 | 714 |

FIG. 7

METHODS, APPARATUS, AND ARTICLES OF MANUFACTURE TO IDENTIFY MEDIA DELIVERY

This patent arises from a continuation of U.S. patent application Ser. No. 13/446,867, filed Apr. 13, 2012, now U.S. patent Ser. No. 9,438,965, the forgoing patent application is hereby incorporated herein by reference in its entirety

FIELD OF THE DISCLOSURE

This disclosure relates generally to audience measurement, and, more particularly, to methods, apparatus, and articles of manufacture to identify media delivery.

BACKGROUND

In recent years, more consumer devices have been provided with Internet connectivity and the ability to retrieve media content from the Internet. As such, media exposure has somewhat shifted away from conventional sources such as broadcast television toward more on-demand types of sources.

BRIEF DESCRIPTION OF THE DRAWINGS

FIG. 6 is a table representative of an example media receiver log.

FIG. 7 is a table representative of an example exposure report.

DETAILED DESCRIPTION

Figure 1:
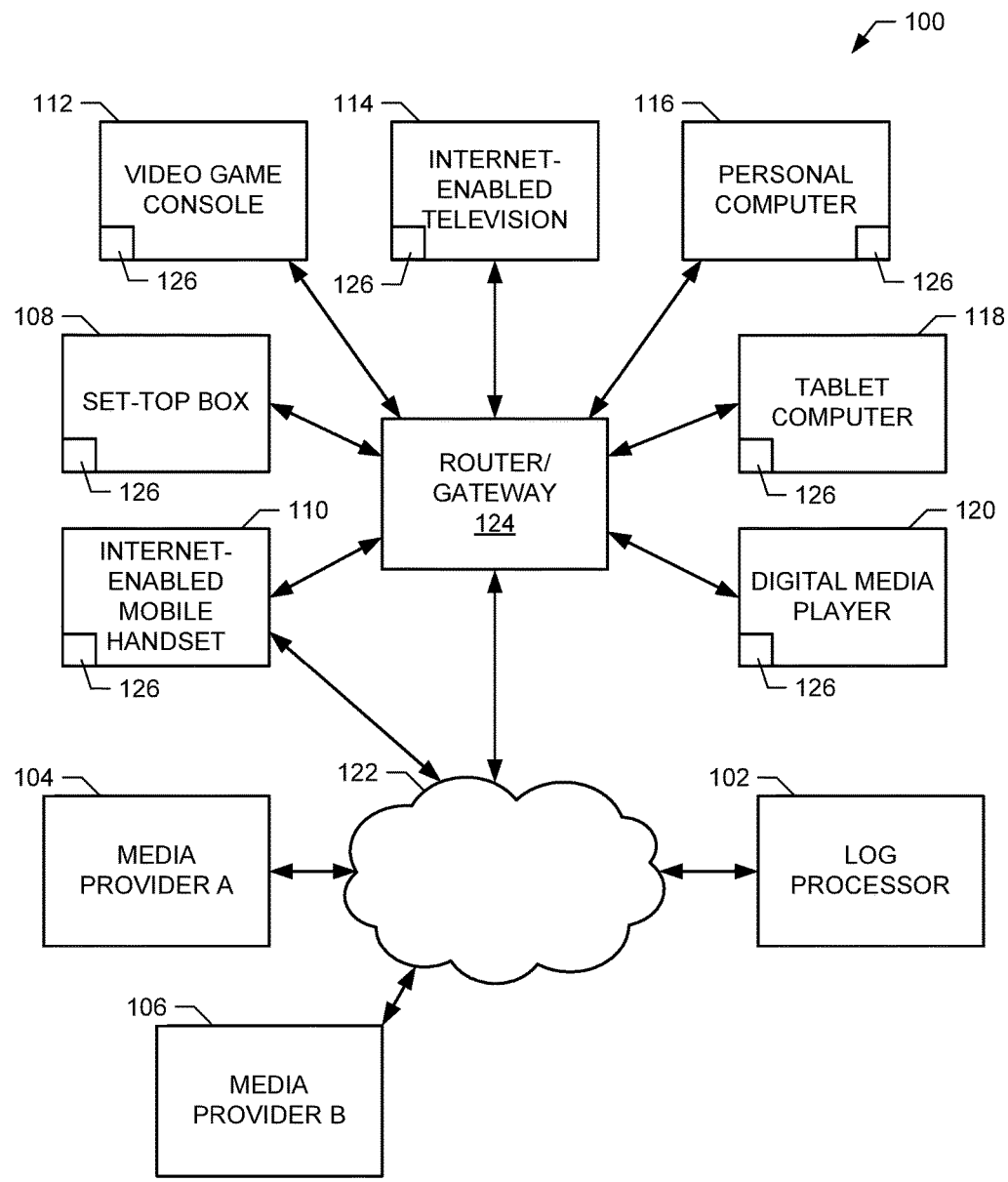
FIG. 1 is a block diagram of an example system including a log processor to process media receiver logs and media provider logs.

Previously, signature matching has been used to identify media presented by a presentation device (e.g., television, radio, digital media devices, etc.). While signature matching can be performed without participation on the part of the media owner or distributor, signature matching can be time and resource-intensive. Furthermore, signature matching uses additional devices or software to capture the audio and/or video (or representations thereof) that have been distributed to media-receiving devices. The use of additional devices to capture the presented media may limit the mobility of a mobile device, reduce the reliability of media capture, or present an additional burden of carrying a capture device to the user of the media receiver. Likewise, the use of software to capture presented media may be difficult to develop due to digital rights management (DRM) software, the large variation in the different devices, computing resource considerations, environmental conditions such as noise, and/or software openness limitations inherent in some mobile devices and/or operating systems.

To overcome the limitations associated with signature matching, example methods, apparatus, and articles of manufacture disclosed herein use logs generated at media providers or distributors (e.g., digital distribution providers such as Netflix, Pandora, Hulu, Amazon, Last.fm, etc.) and logs generated at media receivers (e.g., media presentation devices such as personal computers, tablet computers, smartphones, digital media players, etc.) to identify media that is presented at individual media receivers.

As used herein, the term "media" includes content and/or advertisements of any type whether delivered via television, radio, Internet, gaming consoles, digital versatile discs (DVDs), and/or any other delivery mechanism.

In some examples described below, the logs generated by the media providers and the logs generated by the media receivers include source Internet protocol (IP) addresses, destination IP addresses, source port numbers, and destination port numbers. The media receivers and the media providers determine this information based on IP packets transmitted from the media provider to the media receiver. In some examples, the IP packets from which the information is determined include audio and/or video media (e.g., in the payload of the packet).

In some examples, the media provider logs an identification of the media delivered via the IP packet in association with the source IP address, destination IP address, source port, and destination port information. In some examples, the media provider further logs a timestamp corresponding to the time the media is delivered to the media receiver. In some such examples, the media receiver also logs a timestamp corresponding to the time the media is received. In some examples, the timestamps are determined from respective local clocks of the media receiver and the media provider. In other examples, the media receiver and the media provider store a timestamp transmitted in the IP packet.

Based on the logs generated by the media provider and the media receiver, a log processor determines the media provided to the media receiver. In some examples, the media receiver is uniquely identifiable and the media delivered to the media receiver can be identified and/or monitored. In some examples, the log processor receives the logs from the media receiver and the logs from the media provider and attempts to match entries in the media provider log to entries in the media receiver log. In some examples, a match is considered to exist when an IP address of a media receiver matches an IP address of the media receiver as stored by the media provider. In some such examples, a match is considered to exist when the source IP address, destination IP address, source port, and destination port for a single entry in the media provider log matches the source IP address, destination IP address, source port, and destination port for a single entry in the media receiver log. In some examples, the log processor determines a match further based on a matching or similar timestamp (e.g., the difference between the timestamps is less than a threshold).

In some examples, when the log processor identifies a match, the log processor generates an entry in an exposure log including an identification of the media receiver and an identification of the media. In some such examples, the log processor further stores an identification of the media provider and/or a timestamp.

FIG. 1 is a block diagram of an example system 100 including a log processor 102 to process media receiver logs and media provider logs. The example system 100 of FIG. 1 may be used to identify media delivery using individual Internet-enabled devices.

The example of FIG. 1 includes the log processor 102, one or more media providers 104, 106, and one or more media receivers 108-120. The log processor 102, the media providers 104, 106, and the media receivers 108-120 are communicatively coupled via a network 122, such as the Internet.

In the illustrated example of FIG. 1, the media receivers 108-120 are associated with a household (e.g., a "Nielsen family") that has been statistically selected for monitoring for the purpose of developing ratings data (e.g., television ratings, cross-platform ratings, etc.) for a population/demographic of interest. One or more persons using the media receivers 108-120 may have registered with the system (e.g., by agreeing to be a panelist) and may have provided the demographic information as part of the registration.

The example media receivers 108-120 of FIG. 1 include a set-top box 108, an Internet-enabled mobile handset (e.g., a smartphone) 110, a video game console 112 (e.g., an Xbox®, a Playstation®, etc.), an Internet-enabled television 114, a personal computer 116, a tablet computer 118, and/or a digital media player 120. The media receivers 108-120 receive audio and/or video from the media providers 104, 106 via one or more applications. For example, the tablet computer 118 may include a specialized or general application to interface with the first media provider 104, and another specialized or general application to interface with the second media provider 106.

In the example of FIG. 1, each of the media receivers 108-120 is monitored to identify media delivered to and/or presented by the respective media receivers. To this end, each of the media receivers 108-120 is provided with a monitor 126. While each of the media receivers 108-120 may have different hardware and/or software platforms, the monitor 126 may be substantially simpler than known signature monitoring applications and, thus, easier to implement on a variety of devices. The monitor 126 may be provided to the media receivers 108-120 as a standalone application (e.g., downloadable from an Internet and an application store such as iTunes®), integrated into respective operating systems of the media receivers 108-120 (e.g., at the time of manufacture and/or via a software update), and/or integrated into other applications of the media receivers 108-120. In some examples, the media receivers 108-120 are provided with the monitor 126 upon selection of the user as a participant in an audience measurement panel. The media receiver and/or the monitor may be uniquely identifiable to facilitate development of audience measurement data. In some other examples, the media receiver and/or the monitor provide anonymous specifications about the media receiver, usage of the receiver, the user of the receiver and/or software installed on the media receiver to facilitate development of audience measurement data.

In the example system of FIG. 1, the media is requested and delivered via a data communications network (e.g., the network 122 of FIG. 1 which may be, for example, the Internet). When a media provider 104, 106 delivers media to a media receiver 108-120, the media provider divides the media into multiple packets (e.g., IP version 4 packets, IP version 6 packets, etc.). The packets each contain a portion of the data representing the media. Additionally, the packets include a source IP address describing the source of the packet (e.g., the media provider) and a destination IP address describing the destination of the packet (e.g., the media receiver). In the illustrated example, the data payloads of at least some of the packets are organized according to Transmission Control Protocol (TCP) or User Datagram Protocol (UDP). Accordingly, the example packets further include a source port number and a destination port number.

Upon initiation of media delivery from a media provider 104, 106 to a media receiver 108-120, the media provider 104, 106 generates an entry in a media provider log and populates the entry with the source IP address, the destination IP address, the source port number, the destination port number, and a media identifier to log the delivery of media to the media receiver 108-120. Similarly, upon requesting and/or receiving media, the monitor 126 of the media receiver 108-120 generates an entry in a media receiver log and populates the entry with the source IP address, the destination IP address, the source port number, and the destination port number. In some examples, the media provider 104, 106 and/or the monitor 126 of the media receiver 108-120 further include start timestamps and/or an end timestamps in their respective log entries. The timestamps may be based on local clocks and/or may be derived from one or more timestamps included in the packets.

Periodically, aperiodically, at particular times, in response to events, and/or on demand, the media providers 104, 106 and/or the monitors 126 of the media receivers 108-120 transmit stored logs to the log processor 102. The example log processor 102 receives the media provider logs and the media receiver logs and matches corresponding entries in the logs to identify media delivered to and/or presented by the media receivers. In the example of FIG. 1, the log processor 102 matches log entries by matching a source IP address, a destination IP address, a source port number, and a destination port number in a media provider log entry to a source IP address, a destination IP address, a source port number, and a destination port number in a media receiver log entry. The example log processor 102 may take a media receiver-centric perspective (e.g., the source IP address and source port are the media receivers, while the destination IP address and destination port are the media providers). In some other examples, the log processor 102 may take a media provider-centric perspective (e.g., the source IP address and source port are the media providers, while the destination IP address and the destination port are the media receivers). In some examples, the log processor 102 additionally or alternatively determines matching log entries by matching timestamps in the log entries. In such examples, the matching may include some or all of the source IP addresses, the destination IP addresses, the source port numbers, and the destination port numbers.

When the log processor 102 of the illustrated example identifies a match, the log processor 102 associates a media identifier in the matching media provider log entry to a device identifier and/or device characteristics in the matching media receiver log and/or log entry.

In the example of FIG. 1, the media receivers 108-120 are connected (e.g., wirelessly and/or via wired connections) to the network 122 via a router/gateway 124, such as a consumer network router, gateway, and/or modem. In some such examples, the media receivers 108-120 have an IP address based on a local area network (LAN). In some cases, the router/gateway 124 performs network address translation (NAT), which changes the destination IP address from the external IP address (e.g., the address assigned to the router/gateway by an Internet service provider). Without correction, the monitors 126 of the media receivers 108-120 on a subnet of the LAN (e.g., assigned an IP address within a subnet range) will log a destination IP address that is not consistent with the destination IP address sent by the media provider 104, 106. To obtain the correct destination IP address, the monitors 126 of the media receivers 108-120 of the illustrated example perform a traceroute or a "whoami" lookup to determine an external IP address. This IP address is then used to populate the destination IP address field of the media receiver logs in place of the local destination IP address set by the router 124. In examples using IP version 6 addresses, the destination IP address correction may be omitted.

In some examples, one or more of the media receivers 108-120 are additionally or alternatively communicatively coupled to the network 122 through a different connection (e.g., not via the router/gateway 124). For example, the Internet-enabled mobile handset 110 is communicatively coupled to the network 122 via a cellular and/or data connection (e.g., 3GPP, 4G, Long-term Evolution (LTE), etc.) in addition to being connected via the router/gateway 124. Some connections to the network 122 may provide the media receiver 108-120 with a unique IP address that may be used as the destination IP address for the monitor(s) 126 to perform logging.

In the example of FIG. 1, the media provided to the different media receivers 108-120 can be uniquely identified and/or monitored. The identification and/or monitoring may be accomplished even when one or more of the media receivers 108-120 share an IP address (e.g., when the receivers 108-120 are on the same LAN and sharing an external IP address, even though they may have different local IP addresses) and/or have identical characteristics (e.g., identical model numbers, identical specifications, etc.). For example, multiple media receivers 108-120 on the same LAN (e.g., having the same destination IP address) may be receiving different media from the same media provider 104, 106. The media provided to each of the media receivers 108-120 is still identifiable because each connection between a media receiver 108-120 and the content provider 104, 106 has a different combination of source IP address (e.g., if different servers are used by the content provider 104, 106 to serve the media), source port, and destination port. Because each of the example media receivers 108-120 of FIG. 1 includes a separate monitor 126 that maintains a separate media receiver log, the example log processor 102 may determine the content provided to any of the media receivers 108-120 by matching entries in the media receiver log for a particular media receiver 108-120 to the entries in the media provider logs for the media providers 104, 106. Additionally, entries that include one or more timestamps (e.g., a starting timestamp and/or an ending timestamp) increase the likelihood that a match will be unique by narrowing the time period within which the combination of source IP address, destination IP address, source port, and destination port is assigned to a particular connection between a media receiver 108-120 and a media provider 104, 106.

In some examples, the log processor 102 increases or ensures the privacy of audience measurement panel participants by avoiding disclosure of knowledge of panelists' identifying information (e.g., IP address). For example, the panelists' IP addresses may be retained by the selector of the audience measurement panel, such as an audience measurement service (e.g., The Nielsen Company). In these examples, the log processor 102 receives the potentially identifying information (e.g., IP addresses) from panelists and receives the media identifiers and performs the matching, thereby avoiding disclosure of the potentially identifying information to the media providers 104, 106. These examples have the additional advantage of providing anonymity to the panelists and avoiding disparate treatment to panelists by the media providers 104, 106 (e.g., throttling or boosting of connection speeds, etc.). In examples in which the log processor 102 is implemented by a provider other than the selector of the audience measurement panel (e.g., a data processing service, a cloud computing service, etc.), the potentially identifying information (e.g., IP addresses) may be processed via a one-way hash algorithm, with the results of the hash provided to the data processing service for matching.

In some examples, either the media providers 104, 106 or the media receivers 108-120 generate log entries, but not both. In some such examples, the monitor 126 provides identifying information for the respective media receiver 108-120 (e.g., device identifier, device characteristics, monitor identifier, etc.) to the media provider 104, 106. This information may be provided when, for example, the media receiver 108-120 initially requests and/or begins receiving media from the media provider 104, 106. For example, the monitor 126 may engage in a "handshake" with the media provider 104, 106, at which time the monitor 126 provides the identifying information for the media receiver 108-120.

Continuing with the example, the example media provider 104, 106 generates a log entry identifying the media receiver 108-120 and/or the respective monitor 126, as well as an identification of the media provided to the media receiver 108-120. This information may then be provided to the log processor 102. While such an example reduces or eliminates the processing used to match media provider log entries with media receiver log entries, this example may result in a reduction of privacy or anonymity for members of an audience measurement panel.

Figure 2:
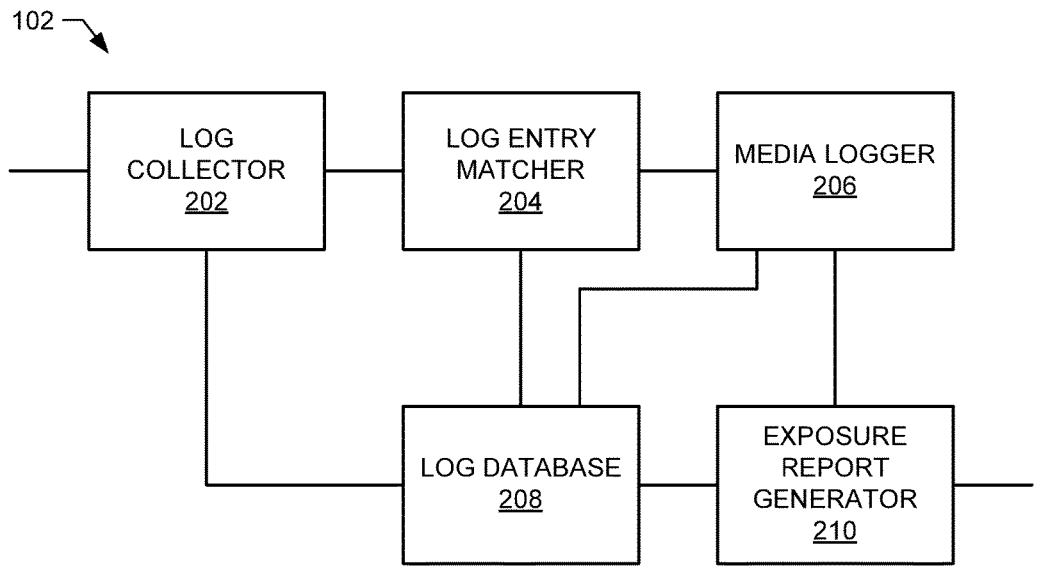
FIG. 2 is a block diagram representative of the example log processor of FIG. 1.

FIG. 2 is a more detailed block diagram of the example log processor 102 of FIG. 1. The example log processor 102 of FIGS. 1 and 2 may be used to identify media delivered to and/or presented by one or more media receivers (e.g., the media receivers 108-120 of FIG. 1). The example log processor 102 of FIG. 2 includes a log collector 202, a log entry matcher 204, a media logger 206, a log database 208, and an exposure report generator 210. The example log processor 102 of FIG. 2 receives media provider logs and media receiver logs, matches entries in the logs, and logs media delivered to and/or presented by each media receiver based on matching entries. In the example of FIG. 2, the log processor 102 further generates reports (e.g., exposure reports) that provide information on the media presented via the media receivers 108-120.

The example log collector 202 of FIG. 2 receives one or more media provider logs from media provider(s) (e.g., the media providers 104, 106 of FIG. 1, such as Netflix®, Hulu®, Pandora®, etc.). The example log collector 202 also receives one or more media receiver log(s) from media receiver(s) (e.g., the media receivers 108-120 of FIG. 1, such as iPads or other tablets, Google® TVs™, digital media players, personal computers, etc.). The log collector 202 may include and/or may interface with a network interface device, such as an Ethernet interface, a WiFi interface, a cellular or other wireless radio, and/or any other type of network interface through which the log collector 202 may connect to a network (e.g., the network 122 of FIG. 1).

The example log collector 202 of FIG. 2 provides the received logs to a log entry matcher 204 and/or to the log database. The example log entry matcher 204 of FIG. 2 identifies matches between entries in media receiver logs and entries in media provider logs. For example, the log entry matcher 204 may determine that a match exists by comparing: 1) a first source IP address in a media receiver log entry to a second source IP address in a media provider log entry; 2) a first destination IP address in the media receiver log entry to a second destination IP address in the media provider log entry; 3) a first source port in the media receiver log entry to a second source port in the media provider log entry; and/or 4) a first destination port in the media receiver log entry to a second destination port in the media provider log entry.

In the example of FIG. 2, if all four comparisons result in matching data, the log entry matcher 204 determines that a match exists because the source IP address, the destination IP address, the source port, and the destination port uniquely identify a connection between two devices via a network. On the other hand, if any of the four comparisons result in a non-match, the log entry matcher 204 determines that a match does not exist between the two compared entries. In some examples, the log entry matcher 204 ends the comparison of two entries when a first mismatch is found.

In some examples, the log entry matcher 204 further compares a timestamp in the entry. The timestamp may be representative of a start of a connection between a media provider and a media receiver or the end of such a connection. In some such examples, the log entry matcher 204 compares both a start time stamp representative of the start of a connection and an end timestamp representative of the end of the connection. Comparisons of the timestamp(s) can further confirm the uniqueness of the connection between the media receiver and the media provider. The use of timestamps is particularly advantageous when multiple potential media receivers share an IP address (e.g., on a local area network with a shared gateway, etc.).

The example log entry matcher 204 may use any appropriate database processing technique(s) (e.g., bubble sorting, etc.) to identify matching entries. Some database processing techniques may be more appropriate than others in a particular situation to achieve efficient processing and matching of log entries.

When the log entry matcher 204 of the illustrated example identifies an entry in a media receiver log that matches an entry in a media provider log, the log entry matcher 204 provides the entries to the media logger 206 and/or stores the entries in the log database 208 as matching entries. The example media logger 206 of FIG. 2, in response to the log entry matcher 204 identifying a match, stores an identification of the media from the media provider log entry in association with the media receiver for the matching media receiver log entry. In some examples, the media identification is determined from the matching media provider log entry. Depending on the information provided by the media receiver log, the example media logger 206 of the illustrated example may store the media identification in association with a unique device identifier and/or in association with one or more characteristics (e.g., device specifications, software versions, etc.) of the media receiver. The media logger 206 stores the media identification and the media receiver in the log database 208 and/or provides the information to the exposure report generator 210.

In some examples, the media logger 206 converts the media identification received from the media provider log entry to another media identification representative of the same media. This conversion may advantageously be used to harmonize the identification of the same media from different providers. For example, Netflix may have a first media identifier for a particular episode of a particular television series, while Hulu may have a different media identifier for the same episode of the same series. The example media logger 206 of FIG. 2 converts the media identifiers to a uniform media identifier. The uniform media identifier may then be used to generate exposure reports.

The example log database 208 of FIG. 2 stores received media provider logs, received media receiver logs, matching entries, audience measurement information, and/or exposure reports.

The example exposure report generator 210 of FIG. 2 generates exposure reports. In some examples, the exposure reports include media delivered to individual media receivers, media delivered to types of media receivers, media delivered to audiences having particular characteristics (e.g., geodemographic characteristics), and/or any other type of audience measurement and/or media presentation information. Thus, the exposure reports provide the opportunity for improved audience statistics to be provided to participating media providers by leveraging the geodemographic data of audience measurement panels. The exposure report generator 210 of FIG. 2 may generate exposure reports periodically, aperiodically, in response to one or more triggers, at particular times, and/or on request.

Figure 3:
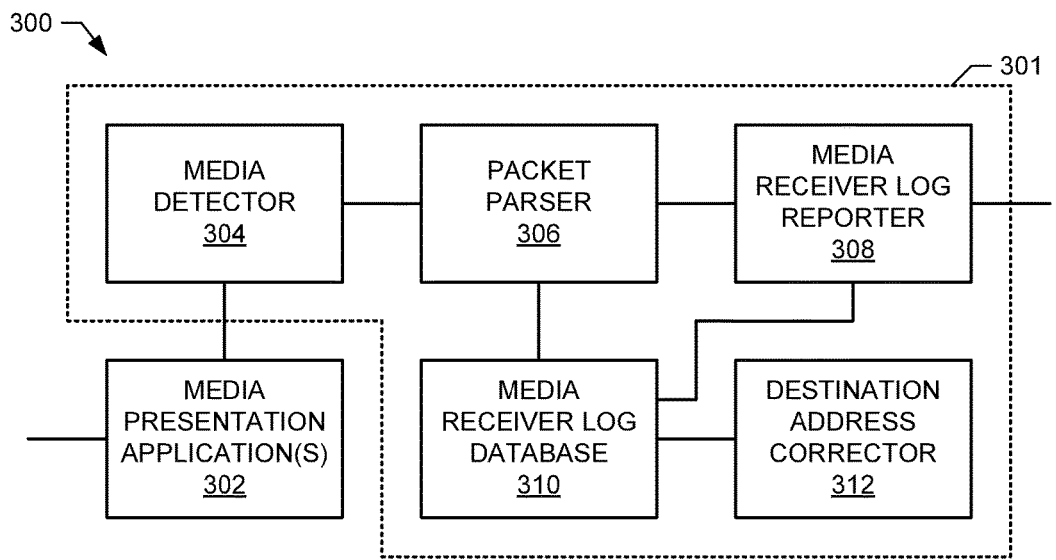
FIG. 3 is a block diagram representative of any of the example media receivers of FIG. 1.

FIG. 3 is a block diagram of an example media receiver 300 to implement any or all of the media receivers 108-120 of FIG. 1 and accompanying monitor(s) 126. The example media receiver 300 of FIG. 3 may be used to present media to one or more audience members and to report information representative of media presentation to a log processor (e.g., the log processor 102 of FIGS. 1 and 2). The example media receiver 300 of FIG. 3 includes a media receiver monitor 301 and one or more media presentation application(s) 302. The example media receiver monitor 301 includes a media detector 304, a packet parser 306, a media receiver log reporter 308, a media receiver log database 310, and a destination corrector 312. The example processor platform 1200 of FIG. 12 may be used to implement the media receiver 300.

The example media presentation application(s) 302 present media received from a media provider (e.g., the media providers 104, 106 of FIG. 1) to a user. The media presentation application(s) 302 of FIG. 3 communicate via a network interface (e.g., the interface 1220 of FIG. 12) and a network (e.g., the network 120 of FIG. 1, the network 1226 of FIG. 12, etc.) to receive media via data communications. For example, a user of the media receiver 300 may download a Netflix application (a media presentation application) to the media receiver 300. The user then interacts with the Netflix application 302 to request a movie to be shown on the media receiver (e.g., via a visual display and/or speakers on the media receiver). The Netflix application 302 requests the media from the Netflix media servers (a media provider), which provides the media to the media receiver 300. The Netflix application 302 receives the media and presents the media via the display screen and/or audio speakers.

The example media detector 304 of the media receiver monitor 301 of FIG. 3 detects media receiving events. For example, the media detector 304 may monitor network interfaces of the media receiver 300 to identify open connections representative of receiving media. In some other examples, the media detector 304 monitors the media presentation application(s) 302 and/or the media presentation application(s) 302 notify the media detector 304 when media presentation application(s) 302 receive media. In yet some other examples, the media detector 304 monitors (e.g., polls) the status of the media presentation application(s) 302 to determine whether any media presentation application(s) 302 are actively presenting media.

When the example media detector 304 detects a media receiving event, the media detector 304 provides one or more packets (e.g. IP packets) associated with the event (e.g., containing audio and/or video information) to the packet parser 306 of the media receiver monitor 301. The example packet parser 306 of FIG. 3 identifies a source IP address, a destination IP address, a source port, and a destination port from the packet associated with the media receiving event. In some examples, the packet parser 306 further identifies and stores a timestamp determined from the packet and/or from an internal clock of the media receiver 300. The example packet parser 306 stores the identified information (e.g., in the media receiver log database 310) and/or provides the identified information to the log reporter 308.

The example media receiver log reporter 308 of the media receiver monitor 301 of FIG. 3 sends a media receiver log to a log processor for identification of media presented by the media receiver 300. For example, the media receiver log reporter 308 may assemble information identified by the packet parser 306 and/or stored in the media receiver log database 310 into log entries. The media receiver log reporter 308 appends identifying information about the media receiver 300 and/or characteristic information about the media receiver 300 to the log. For example, the media receiver log reporter 308 may append an identification number assigned to the media receiver 300 and/or to the media receiver monitor 301, a serial number of the media receiver 300 and/or of the media receiver monitor 301, specifications of the media receiver 300, software information for the media receiver 300, and/or any other identifying or characterizing information of the media receiver 300 and/or of the media receiver monitor 301.

The example media receiver log database 310 of the media receiver monitor 301 stores the information extracted or identified by the packet parser 306. The example media receiver log database 310 may further provide the information to the media receiver log reporter 308 for inclusion in a media receiver log.

The example destination address corrector 312 of the media receiver monitor 301 of FIG. 3 adjusts or corrects the destination address information (e.g., destination IP addresses) in the media receiver log database 310. As described above, in some cases an intermediate device such as a consumer gateway or a router (e.g., the router 124 of FIG. 1) may alter the destination IP address of IP packets used by the packet parser 306 to identify destination address information. As a result, the packet parser 306 may, in some cases, store a destination IP address that will not properly match with a destination IP address in a corresponding media provider log entry. The example destination address corrector 312 of FIG. 3 determines the appropriate destination IP address (e.g., an external IP address for a local area network). In some examples, the destination address corrector 312 performs a traceroute routine or performs a whoami lookup to obtain the destination IP address. The destination address corrector 312 may perform this task periodically, aperiodically, upon detection of a media receiving event, or on request.

Using the correct destination IP address, the example destination address corrector 312 of FIG. 3 modifies the entries in the media receiver log database. In some examples, the example destination address corrector 312 modifies only those media receiver log entries having a timestamp within a time period during which the media receiver 300 had the destination IP address identified by the destination address corrector 312 (e.g., while the external IP address of the LAN is the identified destination IP address). The example media receiver log reporter 308 then provides the media receiver log entries having the corrected destination IP address to the log processor.

Figures 4, 5:
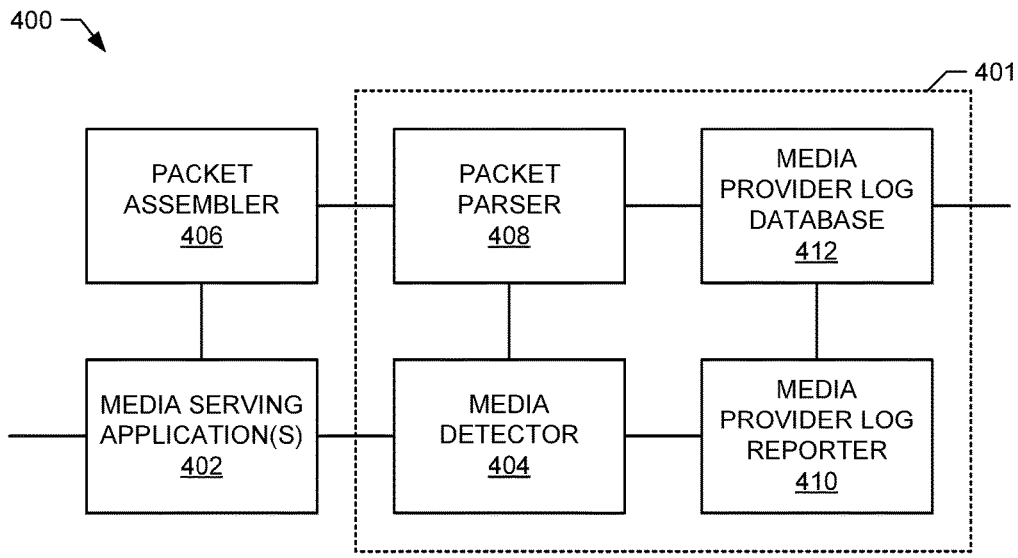
FIG. 4 is a block diagram representative of any of the example media providers of FIG. 1.
FIG. 5 is a table representative of an example media provider log.

FIG. 4 is a block diagram of an example media provider 400 to implement any of the media providers 104, 106 of FIG. 1 and its accompanying media provider monitor 401. The example media provider 400 provides media to media receiver(s) and the media provider monitor 401 report(s) information representative of the media provided to a log processor (e.g., the log processor 102 of FIGS. 1 and 2). The example media provider 400 of FIG. 4 includes the media provider monitor 401, one or more media serving application(s) 402, and a packet assembler 404. The example media provider monitor 401 includes a media detector 406, a packet parser 408, a media provider log reporter 410, and a media provider log database 412.

The example media serving application(s) 402 of FIG. 4 serve or provide media to media receivers (e.g., the media receivers 108-120 of FIG. 1). The media serving application(s) 402 of FIG. 4 communicate via a network interface (e.g., the interface 1220 of FIG. 12) and a network (e.g., the network 122 of FIG. 1, the network 1226 of FIG. 12, etc.) to serve or provide media to media receivers via data communications. For example, when one of the media serving application(s) 402 receives a request (e.g., an HTTP request) for media (e.g., an episode of a television show, a movie, a song, etc.) from a media receiver, the media serving application 402 begins transmitting packets of data including the audio and/or video constituting the requested media to the requesting address.

In some examples, the selected media serving application 402 is based on the characteristics of the requesting media receiver. For example, a first media serving application may serve media to media receivers that request the media via a web browser application, while a second media serving application may serve media to media receivers that request the media via a software application designed to present media from the media provider 400. In some examples, an instance of a media serving application 402 is spawned for each connection to a media receiver, and the instance of the media serving application 402 is eliminated when the connection is destroyed or the media delivery is stopped.

The example packet assembler 404 of the example media provider 400 of FIG. 4 generates a packet including a source IP address, a destination IP address, a source port, a destination port, and the media to be delivered. In most instances, the packet assembler will generate many such packets to deliver the data representative of the media to the media receiver. The example packet assembler 404 of FIG. 4 stores connection-identifying information (e.g., the source IP address, the destination IP address, the source port, and the destination port) included in the assembled packet with an identification of the media being delivered. In some examples, the packet assembler 404 further stores one or more timestamps representing a time at which the connection was initiated and/or a time at which the connection ended. The timestamp information may be determined from a local clock and/or from a timestamp inserted into the packet to be delivered.

The example media detector 406 of the example media provider monitor 401 of FIG. 4 detects media providing events. For example, when one of the media serving application(s) 402 initiates transmission of media to a media receiver 108-120, the media serving application 402 notifies the media detector 406. In some other examples, the media detector 406 monitors open connections maintained by the media serving application(s) 402 and/or by the media provider 400. When the media detector 406 identifies a media providing event, the media detector 406 notifies the packet parser 408.

The example packet parser 408 receives one or more packets including media to be transferred to the requesting content receiver. The packet parser 408 generates a media provider log entry including a source IP address, a destination IP address, a source port number, and a destination port number from the received packets. The generated media provider log entry further includes an identification of the media provided. The example packet parser 408 stores the media provider log entry in the media provider log database 412 and/or provide the media provider log entry to the media provider log reporter 410.

The example media provider log reporter 410 of the example media provider monitor 401 of FIG. 4 generates and sends a media provider log to a log processor (e.g., the log processor 102 of FIG. 1) for identification of a media receiver to which the media was provided. In the example of FIG. 4, the log entries include the source IP address, the destination IP address, the source port, the destination port, one or more timestamps, and an identification of the media provided to the media receiver. In some examples, the media provider log includes log entries for each unit of media (e.g., song, album, television program episode, movie, video, etc.) provided to a media receiver. The example media provider log reporter 410 of FIG. 4 further appends a provider identifier to the media provider log and/or to the entries in the media provider log. The provider identifier may be used by the log processor 102 to measure the media provided or served by different media providers 104, 106.

In some examples, the media provider log reporter 410 converts or maps internal or proprietary media identifiers in the log entries to media identifiers that are recognizable or known to the log processor 102. For example, the same media identifiers may be provided by the log processor 102 to each media provider that provides media provider logs to the log processor 102. In some other examples, the internal or proprietary media identifiers are provided to the log processor 102 to facilitate identification of media.

The example media provider log database 412 stores the information generated or identified by the packet parser 408. The example media provider log database 412 may further provide the information to the media provider log reporter 410 for inclusion in a media provider log.

FIG. 5 is a table representative of an example media provider log 500. The example media provider log 500 of FIG. 5 may be generated and provided by the media provider monitor of a media provider (e.g., the media provider 104, 106 of FIG. 1, the media provider 400 of FIG. 4, the media provider monitor 401 of FIG. 4) to a log processor (e.g., the log processor 102 of FIGS. 1 and 2) to enable identification of media delivered to and/or presented by media receivers (e.g., the media receivers 108-120 of FIG. 1).

The example media provider log 500 of FIG. 5 includes multiple log entries 502*a*-502*l*. Each of the example log entries 502*a*-502*l* includes a source IP address 504, a destination IP address 506, a source port 508, a destination port 510, a timestamp 512, and a media identifier 514. The example media provider log 500 further includes a provider identifier 516. The example provider identifier 516 uniquely identifies the media provider. In some other examples, the provider identifier 516 is included in each of the log entries 502*a*-502*l*.

FIG. 6 is a table representative of an example media receiver log 600. The example media receiver log 600 of FIG. 6 may be generated and provided by monitor of a media receiver (e.g., the media receivers 108-120 of FIG. 1, the media receiver 300 of FIG. 3, the media receiver monitor 301 of FIG. 3) to a log processor (e.g., the log processor 102 of FIGS. 1 and 2) to enable identification of media presented by the media receivers 108-120.

The example media receiver log 600 of FIG. 6 includes multiple log entries 602*a*-602*l*, where each of the example log entries 602*a*-602*l* includes a source IP address 604, a destination IP address 606, a source port 608, a destination port 610, and a timestamp 612. The example media receiver log 600 further includes a device identifier 614, a device model number 616, and a content receiver monitor identifier 618. In some other examples, the device identifier 614 is included in each of the log entries 602*a*-602*l*. Additionally or alternatively, the media receiver log 600 may include other specifications or characteristics of the media receiver and/or the media receiving monitor that generated the media receiver log.

FIG. 7 is a table representative of an example exposure report 700. The example exposure report 700 of FIG. 7 may be generated by a log processor (e.g., the log processor 102 of FIGS. 1 and 2) based on a comparison of media receiver log entries to media provider log entries. The example exposure report 700 includes report entries 702*a*-702*e*. Each example report entry 702*a*-702*e* represents a match between an entry in a media provider log (e.g., the entries 502*a*-502*l* in the media provider log 500 of FIG. 5) and an entry in a media receiver log (e.g., the entries 602*a*-602*l* in the media provider log 600 of FIG. 6).

Each of the example report entries 702*a*-702*e* includes a device identifier 704, a device type description 706, a media identifier 708, a provider identifier 710, and a timestamp 712. The example report entries 702*a*-702*e* may include more or less information than is shown in the example exposure report 700 of FIG. 7. The example device identifier 704, the example device type description 706, and the content receiver monitor identifier 708 information are obtained from media receiver logs and/or media receiver log entries. In contrast, the example media identifier 710 and the provider identifier 712 are obtained from and/or determined based on the media provider logs and/or media provider log entries. The timestamp 714 information may be obtained from either or both of the example media provider log entries or the media receiver log entries.

While example data is illustrated in the logs 500, 600 of FIGS. 5 and 6 and the report 700 of FIG. 7, more, less, and/or different information may be included to improve audience measurement and/or media presentation measurement.

While example manners of implementing the log processor 102, the media providers 104, 106, and the media receivers 108-120 of FIG. 1 has been illustrated in FIGS. 2, 3, and 4, one or more of the elements, processes and/or devices illustrated in FIGS. 2, 3, and/or 4 may be combined, divided, re-arranged, omitted, eliminated and/or implemented in any other way. Further, the example log collector 202, the example log entry matcher 204, the example media logger 206, the example log database 208, the example exposure report generator 210, the example media receiver monitor 301, the example media presentation application(s) 302, the example media detector 304, the example packet parser 306, the example media receiver log reporter 308, the example media receiver log database 310, the example destination address corrector 312, the example media provider monitor 401, the example media serving application(s) 402, the example packet assembler 404, the example media detector 406, the example packet parser 408, the example media provider log reporter 410, the example media provider log database 412 and/or, more generally, the example log processor 102, the example media receiver 300, and/or the example media provider 400 of FIGS. 2, 3, and/or 4 may be implemented by hardware, software, firmware and/or any combination of hardware, software and/or firmware. Thus, for example, any of the example log collector 202, the example log entry matcher 204, the example media logger 206, the example log database 208, the example exposure report generator 210, the example media receiver monitor 301, the example media presentation application(s) 302, the example media detector 304, the example packet parser 306, the example media receiver log reporter 308, the example media receiver log database 310, the example destination address corrector 312, the example media provider monitor 401, the example media serving application(s) 402, the example packet assembler 404, the example media detector 406, the example packet parser 408, the example media provider log reporter 410, the example media provider log database 412 and/or, more generally, the example log processor 102, the example media receiver 300, and/or the example media provider 400 of FIGS. 2, 3, and/or 4 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the apparatus or system claims of this patent are read to cover a purely software and/or firmware implementation, at least one of the example log collector 202, the example log entry matcher 204, the example media logger 206, the example log database 208, the example exposure report generator 210, the example media receiver monitor 301, the example media presentation application(s) 302, the example media detector 304, the example packet parser 306, the example media receiver log reporter 308, the example media receiver log database 310, the example destination address corrector 312, the example media provider monitor 401, the example media serving application(s) 402, the example packet assembler 404, the example media detector 406, the example packet parser 408, the example media provider log reporter 410, and/or the example media provider log database 412 are hereby expressly defined to include a tangible computer readable medium such as a memory, DVD, CD, Blu-ray, etc. storing the software and/or firmware. Further still, the example log processor 102, the example media receiver 300, and/or the example media provider 400 of FIGS. 2, 3, and/or 4 may include one or more elements, processes and/or devices in addition to, or instead of, those illustrated in FIGS. 2, 3, and/or 4, and/or may include more than one of any or all of the illustrated elements, processes and devices.

Flowcharts representative of example machine readable instructions for implementing the log processor 102 of FIG. 2, the media receiver 300 of FIG. 3, and/or the media provider 400 of FIG. 4 are shown in FIGS. 8-11. In this example, the machine readable instructions comprise one or more program(s) for execution by a processor such as the processor 1212 shown in the example processor platform 1200 discussed below in connection with FIG. 12. One or more of the programs may be embodied in software stored on a tangible computer readable storage medium such as a CD-ROM, a floppy disk, a hard drive, a digital versatile disk (DVD), a Blu-ray disk, or a memory associated with the processor 1212, but entire ones of any of the programs and/or parts thereof could alternatively be executed by a device other than the processor 1212 and/or embodied in firmware or dedicated hardware. Further, although the example programs are described with reference to the flowcharts illustrated in FIGS. 8-11, many other methods of implementing the example the log processor 102 of FIG. 2, the media receiver 300 of FIG. 3, and/or the media provider 400 of FIG. 4 may alternatively be used. For example, the order of execution of the blocks may be changed, and/or some of the blocks described may be changed, eliminated, or combined.

As mentioned above, the example processes of FIGS. 8-11 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8-11 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 8:
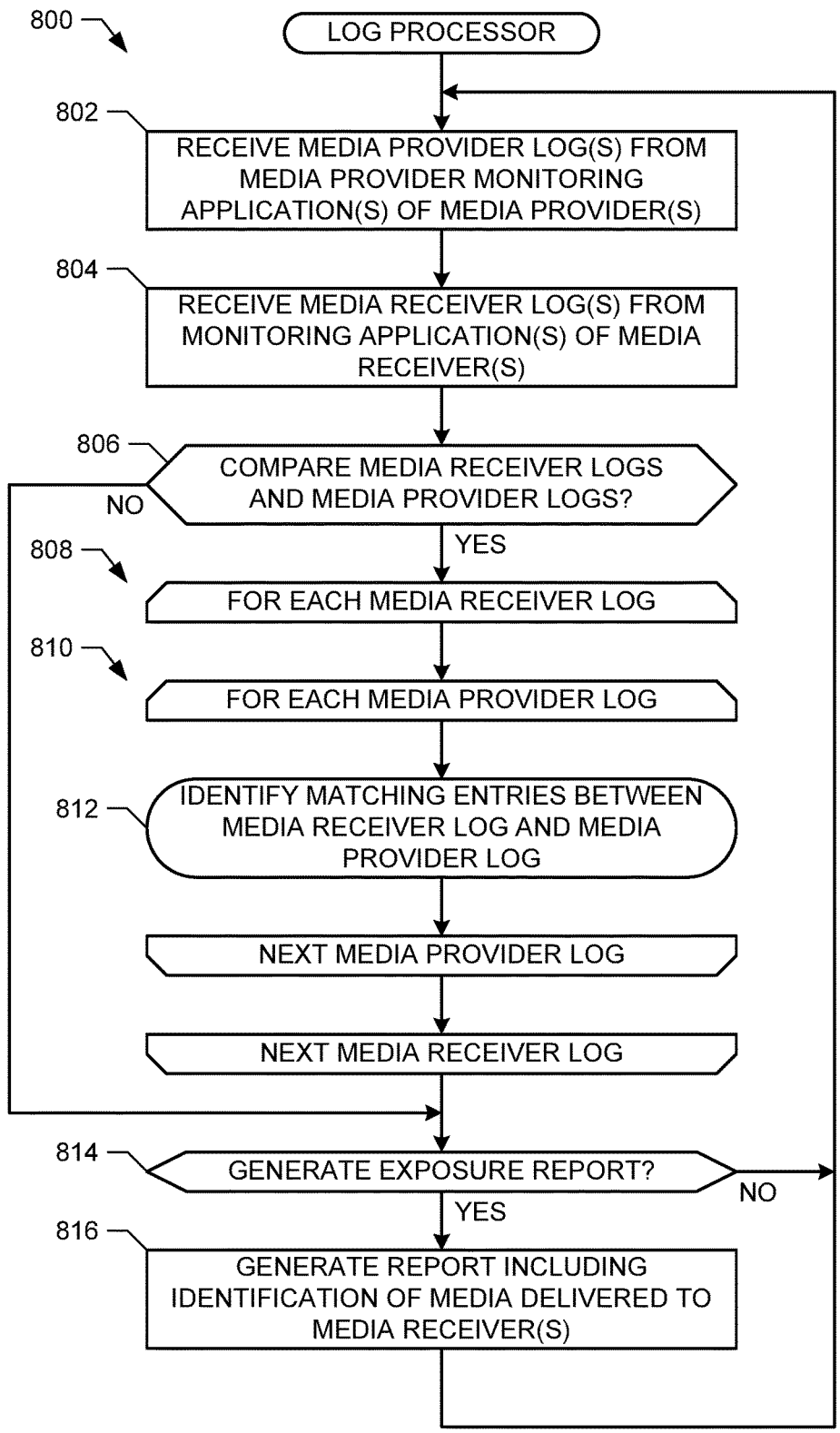
FIG. 8 is a flowchart representative of example machine readable instructions that may be executed to implement the example log processors of FIGS. 1 and 2.

FIG. 8 is a flowchart representative of example machine readable instructions 800 that may be executed to implement the example log processor 102 of FIGS. 1 and 2. The example instructions 800 of FIG. 8 may be performed or executed to compare media receiver logs and media provider logs to identify matching log entries, and/or to generate an exposure report based on identified matches.

The example instructions 800 begin by receiving (e.g., via the log collector 202 of FIG. 2) one or more media provider logs from one or more media providers (block 802). For example, the log collector 202 may receive media source logs transmitted from media providers (e.g., the media providers 104, 106 of FIG. 1) via a network (e.g., the network 122 of FIG. 1). The example log collector 202 also receives one or more media receiver logs from one or more media receivers (block 804). For example, the log collector 202 may receive media receiver logs transmitted from media receivers (e.g., the media receivers 108-120 of FIG. 1) via a network (e.g., the network 122).

The example log processor 102 (e.g., via the log entry matcher 204) determines whether to compare media receiver logs and media provider logs (block 806). For example, the log entry matcher 204 may compare logs periodically, aperiodically, in response to a trigger event, continuously, at particular times, and/or on request. If the log entry matcher 204 is to compare the media receiver logs and the media provider logs (block 806), the log entry matcher 204 enters a for-loop 808 for each of the media receiver logs. With each iteration of the loop 808, the log entry matcher 204 selects a media receiver log to be processed. Thus, at the entry of the loop 808 the example log entry matcher 204 selects a first media receiver log.

Within the loop 808, the example log entry matcher 204 enters another loop (e.g., a nested loop) 810 in which the log entry matcher 204 selects a media provider log. With each iteration of the loop 810, the log entry matcher 204 selects a media provider log to be processed (e.g., compared to the selected media receiver log). Thus, at the entry of the loop 810 the example log entry matcher 204 selects a first media provider log.

When a media receiver log is selected (loop 808) and a media provider log is selected (loop 810), the example log entry matcher 204 identifies matching entries between the media receiver logs (block 812). For example, the log entry matcher 204 of FIG. 2 determines whether any of the entries in the media provider log have the same source IP address, the same destination IP address, the same source port, and the same destination port. Example instructions to implement block 812 are described below with reference to FIG. 9.

After identifying matching entries between the selected media receiver log and the selected media provider log (block 812), the example log entry matcher 204 iterates the loop 810 by selecting another media provider log. When the media provider logs have been processed via loop 810, the example log entry matcher 204 iterates the loop 812 by selecting another media receiver log. The log entry matcher 204 then re-executes the loop 810 with the newly-selected media receiver log. By iterating through nested loops 808 and 810, the example log entry matcher 204 compares each received media provider log with each received media receiver log to identify potential matching log entries.

When the nested loops 808, 810 have been processed, or if the log entry matcher 204 decides it is not time to compare the logs (block 806), the example exposure report generator 210 determines whether to generate an exposure report (block 814). For example, the exposure report generator 210 may generate an exposure report periodically, aperiodically, in response to a trigger event, at particular times, and/or on request.

If the exposure report generator 210 is to generate an exposure report (block 814), the example exposure report generator 210 generates a report including an identification of media delivered to the media receiver(s) (block 816). The identification of media may be determined based on the identification of matching entries performed in block 812. The exposure report may take any desired format based on the data. For example, the exposure report may correlate media with geodemographic data, media with device types and/or characteristics, geodemographic data with device types and/or characteristics, and/or any other type of information that may be derived from the combination of the media provider logs and the media receiver logs.

After generating the report (block 816), or if the exposure report generator decides it is not time to generate the exposure report (block 814), control returns to block 802 to receive additional media provider log(s).

Figure 9:
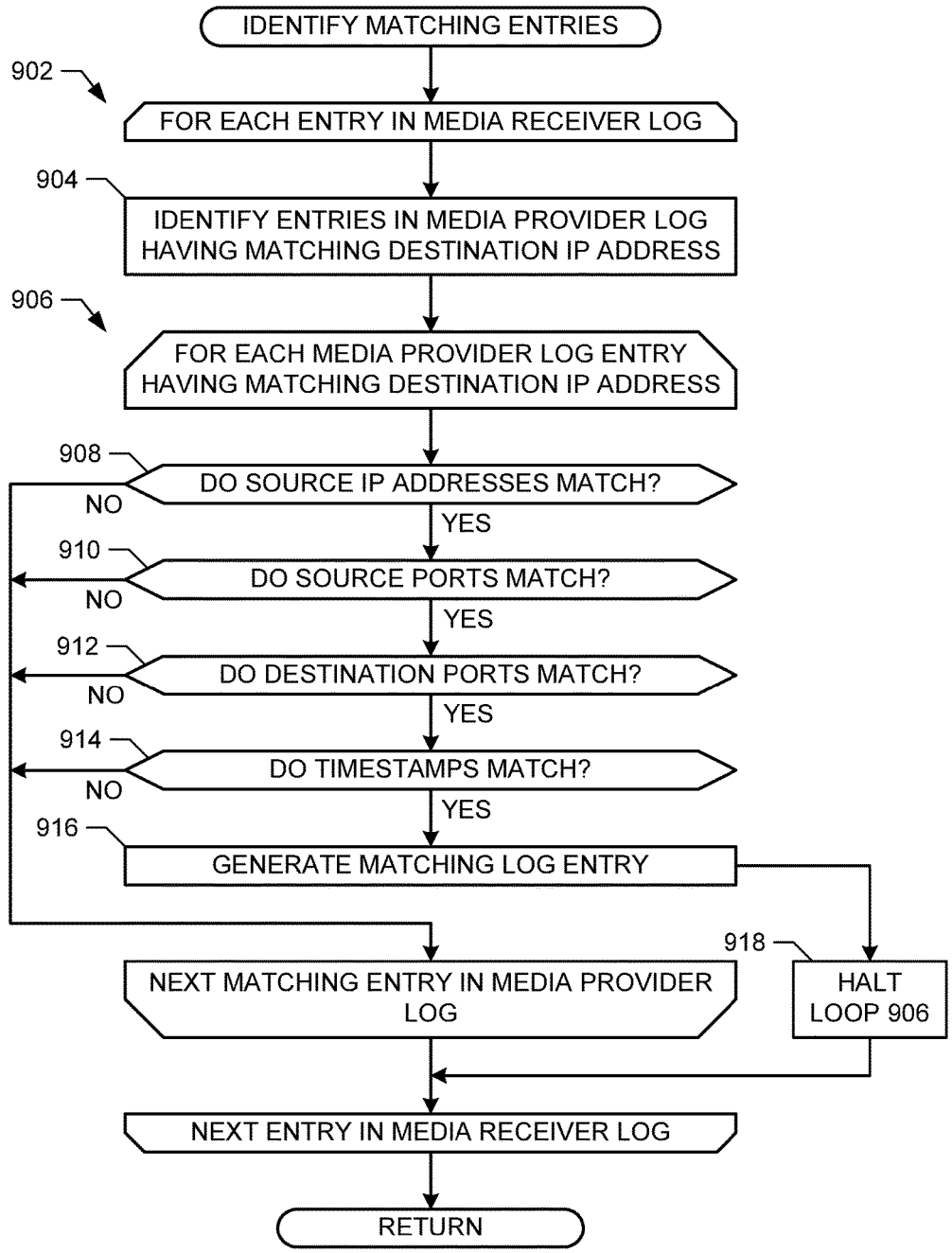
FIG. 9 is a flowchart representative of example machine readable instructions that may be executed to identify matching entries between media receiver logs and media provider logs.

FIG. 9 is a flowchart representative of example machine readable instructions 900 that may be executed to identify matching entries between media receiver logs and media source logs. The example instructions 900 of FIG. 9 may be used to implement the log entry matcher 204 of FIG. 2 and/or block 812 of FIG. 8.

The example instructions 900 of FIG. 9 begin by entering a for-loop 902 for each of the entries in a selected media receiver log (e.g., selected by the log entry matcher 204 in loop 808 of FIG. 8). With each iteration of the loop 902, the log entry matcher 204 selects an entry in the media receiver log to be processed. Thus, at the entry of the loop 902 the example log entry matcher 204 selects a first media receiver log entry.

The example log entry matcher identifies entries in a media provider log (e.g., the media provider log selected by the log entry matcher 204 in loop 810 of FIG. 8) having a destination IP address matching the destination IP address of the selected media receiver log entry (block 904). In many cases, block 904 will substantially reduce the number of entries to be compared by subsequent blocks and conserve computing resources. While the example block 904 of FIG. 9 identifies entries having a matching destination IP address, block 904 may alternatively identify entries having a matching source IP address, a matching source port, a matching destination port, a matching timestamp, and/or any other matching information. In many examples, identifying by the destination IP address and/or the timestamp will result in the fewest number of entries for subsequent processing.

The example log entry matcher 204 then enters a for-loop 906, nested in the loop 902, for each of the media provider log entries having a matching destination IP address. With each iteration of the loop 906, the log entry matcher 204 selects a media provider log entry identified in block 904 to be processed. Thus, at the entry of the loop 906 the example log entry matcher 204 selects a first media provider log entry.

The example log entry matcher 204 determines whether the selected media provider log entry and the selected media receiver log entry have matching source IP addresses (block 908). If the source IP addresses match (block 908), the example log entry matcher 204 determines whether the selected media provider log entry and the selected media receiver log entry have matching source ports (block 910). If the source ports match (block 910), the example log entry matcher 204 determines whether the selected media provider log entry and the selected media receiver log entry have matching destination ports (block 912). If the destination ports match (block 912), the example log entry matcher 204 determines whether the selected media provider log entry and the selected media receiver log entry have matching timestamps (block 914).

Determining whether the selected media provider log entry and the selected media receiver log entry have matching timestamps (block 914) may include, for example, determining whether the log entries have matching "start" timestamps (e.g., timestamps indicating the start of providing media to the media receiver), whether the log entries have matching "end" timestamps (e.g., timestamps indicating the end of providing media to the media receiver), and/or whether the log entries have both matching "start" timestamps and matching "end" timestamps. Where both "start" timestamps and "end" timestamps are compared and either of these comparisons results in a mismatch, the example log entry matcher 204 determines that the timestamps do not match.

If the log entry matcher 204 determines that the selected media provider log entry and the selected receiver log entry having matching source IP addresses (block 908), matching source ports (block 910), matching destination ports (block 912), and matching timestamps (block 914), the example log entry matcher generates a matching log entry (block 916). The example matching log entry includes at least an identification of the media and information representative of the media receiver (e.g., an identifier, a characteristic). On the other hand, if any one or more of the source IP addresses (block 908), the source ports (block 910), the destination ports (block 912), and/or timestamps (block 914) do not match, the example loop 906 iterates to select the next media provider log entry that has a matching destination IP address.

If the example log entry matcher 204 generates a matching log entry (block 916), the log entry matcher halts the iteration of the loop 906 (block 918). Halting the loop 906 is performed because, in the examples described herein, once a pair of matching entries is found, it is unlikely that another entry will be found that matches either entry in the matching pair.

After halting the loop 906 (block 918) or after iterating through the loop 906 (e.g., without finding a matching entry), the example loop 902 iterates to select a next entry in the media receiver log to be processed. The example nested loops 902 and 906 iterate for the entries in each selected media receiver log and selected media provider log pair (e.g., selected by the log entry matcher 204 using the instructions 800 of FIG. 8). After iterating the loop 902, the example instructions 900 may return control to the loop 810 of FIG. 8.

Figure 10:
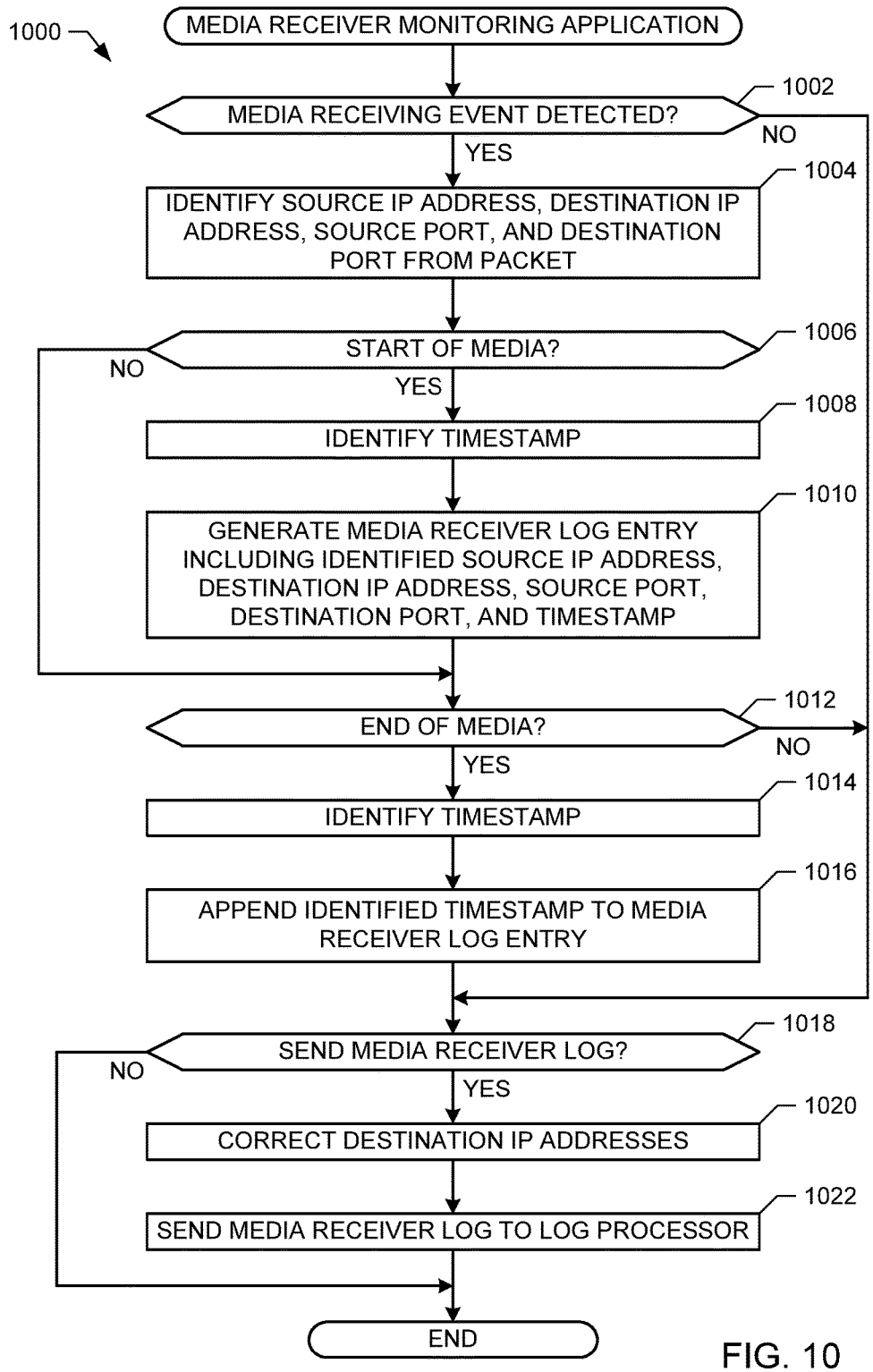
FIG. 10 is a flowchart representative of example machine readable instructions that may be executed to implement a media receiver such as any of the media receivers of FIG. 1.

FIG. 10 is a flowchart representative of example machine readable instructions 1000 that may be executed to implement a media receiver monitor such as any of the media receiver monitor(s) 126 of FIG. 1 and/or the media receiver monitor 301 of FIG. 3. The example instructions 1000 may be executed to generate media receiver log entries and/or to send a media receiver log to a log processor (e.g., the log processor 102 of FIG. 1).

The example instructions 1000 begin by detecting (e.g., via the media detector 304 of the monitor 301 of FIG. 3) a media receiving event (block 1002). For example, the media detector 304 may detect a media receiving event when a media presentation application (e.g., one of the media presentation application(s) 302 of FIG. 3) notifies the media detector 304 that media is being received. If a media receiving event is detected (block 1002), the example packet parser 306 of the monitor 301 of FIG. 3 identifies a source IP address, a destination IP address, a source port, and a destination port from a packet (e.g., an IP packet) received from the media provider (block 1004).

The example packet parser 306 determines whether the packet is the start of the received media (block 1006). For example, the packet parser 306 may determine whether the packet is the first received packet corresponding to a media receiving event. If the packet represents the start of the media (block 1006), the example packet parser 306 identifies a timestamp (block 1008). For example, the packet parser 306 may obtain the timestamp from the IP packet and/or from a local clock on the media receiver. The example packet parser 306 generates a media receiver log entry (e.g., in the media receiver log database 310 of FIG. 3) including the identified source IP address, the identified destination IP address, the identified source port, the identified destination port, and the identified timestamp (block 1010).

After generating the media receiver log entry (block 1010) or if the IP packet is not the start of the media (block 1006), the example packet parser 306 determines whether the IP packet is the end of the media (e.g., the end of the media receiving event) (block 1012). For example, the packet parser 306 may determine whether the packet payload includes information indicative of the end of the media and/or that no subsequent packets corresponding to the media have been received in at least a threshold amount of time. If the end of the media has been identified (block 1012), the example packet parser 306 identifies a timestamp (block 1014). For example, the packet parser 306 may obtain the timestamp from the IP packet and/or from a local clock on the media receiver. The example packet parser 306 then appends the identified timestamp to a corresponding media receiver log entry (e.g., an entry having the same source IP address, the same destination IP address, the same source port, and the same destination port) (block 1016).

After appending the identified timestamp (block 1016) or if the IP packet is not the end of the media (block 1012), the example media receiver log reporter 308 of the monitor 301 of FIG. 3 determines whether to send the media receiver log (block 1018). For example, the media receiver log reporter 308 may send a media receiver log periodically, aperiodically, at particular times, in response to triggering events, in substantial real-time (e.g., entry-by-entry) and/or on demand.

If the media receiver log reporter 308 is to send the media receiver log (block 1018), the destination address corrector 312 corrects the destination IP addresses in the media receiver log to be sent (e.g., in the media receiver log database) (block 1020). For example, the destination address corrector 312 determines whether an IP address of the media receiver 300 is different than an external IP address (e.g., of a LAN through which the media receiver is obtaining network connections). The example destination address corrector 312 may perform a whoami lookup and/or a traceroute routine to determine the proper IP address. If correction is needed, the destination address corrector 312 corrects the applicable destination IP addresses.

The example media receiver log reporter 308 sends the media receiver log to a log processor (e.g., the log processor 102 of FIG. 1) (block 1022). After sending the media receiver log (block 1022) or if the media receiver log reporter 308 decides not to send the log (block 1018), the example instructions 1000 may end and/or control may return to block 1002 to continue monitoring for media receiving events and/or providing media receiver logs to a log processor.

Figure 11:
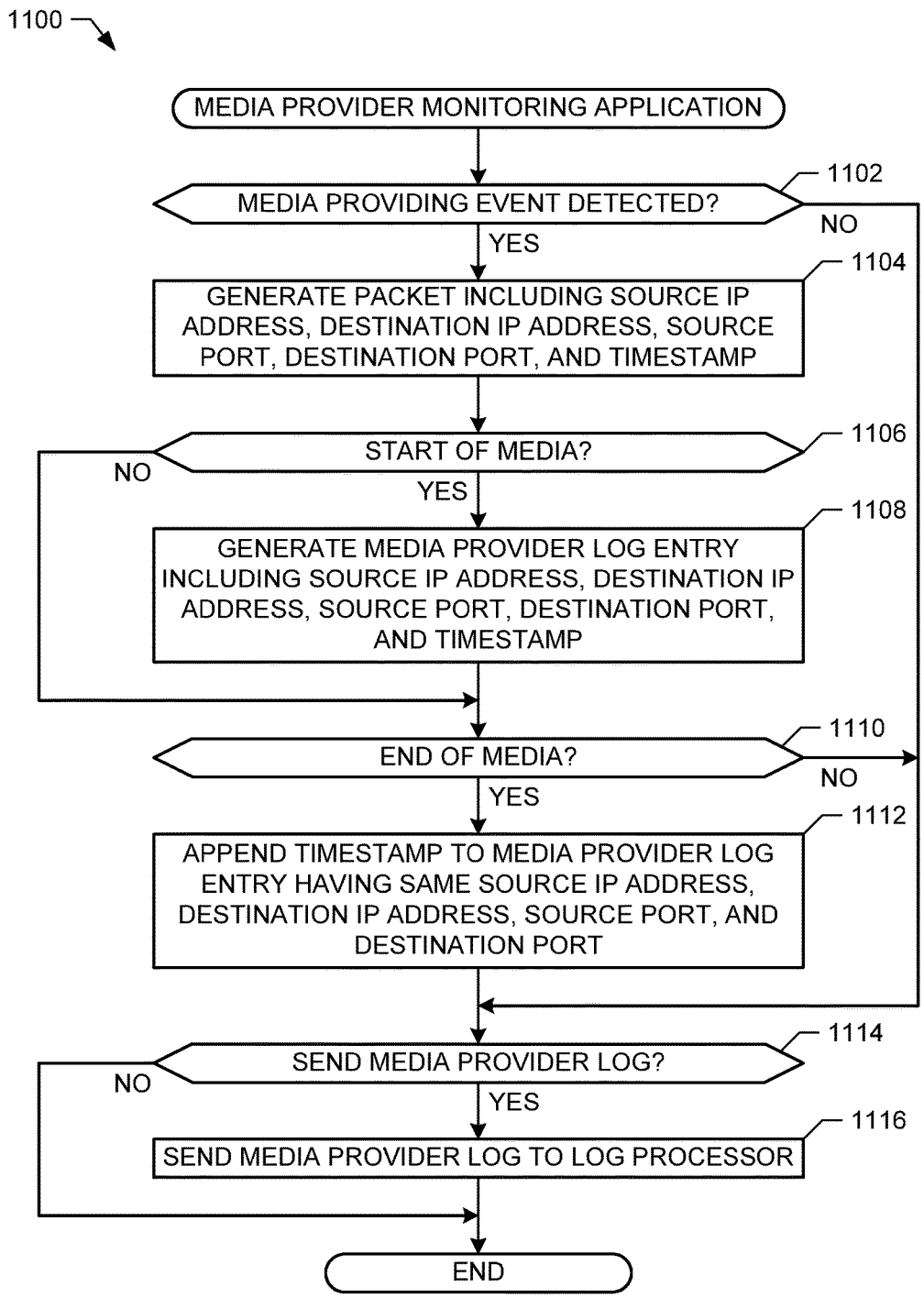
FIG. 11 is a flowchart representative of example machine readable instructions that may be executed to implement a media provider such as any of the media providers of FIG. 1.

FIG. 11 is a flowchart representative of example machine readable instructions 1100 that may be executed to implement a media provider monitor at a media provider such as the media provider monitor 401 of the media providers 104, 106 of FIG. 1 and/or the media provider 400 of FIG. 4. The example instructions 1100 may be executed to generate media provider log entries and/or to send a media provider log to a log processor (e.g., the log processor 102 of FIG. 1).

The example instructions 1100 begin by detecting (e.g., via the media detector 406 of the media provider monitor 401 of FIG. 4) a media providing event (block 1102). For example, the media detector 406 may detect a media providing event when a media serving application (e.g., one of the media serving application(s) 402 of FIG. 4) notifies the media detector 406 that media is being provided to a media receiver (e.g., one of the media receivers 108-120 of FIG. 1) and/or when a content serving application 402 is started. If a media providing event is detected (block 1102), the example packet assembler 404 of FIG. 4 generates a packet (e.g., to provide the media to the media receiver) including a source IP address, a destination IP address, a source port, a destination port, and a timestamp (block 1104).

The example packet parser 408 of the media provider monitor 401 of FIG. 4 determines whether the packet is the start of the media (block 1106). For example, the packet assembler 408 may determine whether the packet includes the beginning of the media to be provided. If the packet represents the start of the media (block 1106), the example packet assembler 408 generates a media provider log entry including the source IP address, the destination IP address, the source port, the destination port, and the timestamp (block 1108).

After generating the media provider log entry (block 1108) or if the packet is not the start of the media (block 1106), the example packet parser 408 determines whether the packet is the end of the media (block 1110). If the packet is the end of the media (block 1110), the example packet parser 408 appends the timestamp to an existing media provider log entry having the same source IP address, the same destination IP address, the same source port, the same destination port, and the same media (block 1112). For example, the packet parser 408 may append an end timestamp to the media provider log entry to facilitate matching of media receiver log entries to media provider log entries.

After appending the timestamp to the media provider log entry (block 1112), if the packet is not the end of the media (block 1110), or if there is no media providing event detected (block 1102), the example media provider log reporter 410 of the media provider monitor 401 of FIG. 4 determines whether to send the media provider log (block 1114). For example, the media provider log reporter 410 may send a media provider log periodically, aperiodically, at particular times, substantially continuously, in response to triggering events, and/or on demand.

If the media provider log reporter 410 is to send the media provider log (block 1114), the example media provider log reporter 410 sends the media provider log to a log processor (e.g., the log processor 102 of FIG. 1) (block 1116). After sending the media provider log (block 1116) or if the media provider log reporter 410 decides it is not time to send the log (block 1114), the example instructions 1100 may end and/or iterate to continue monitoring for media provider events and/or providing media provider logs to a log processor.

Figure 12:
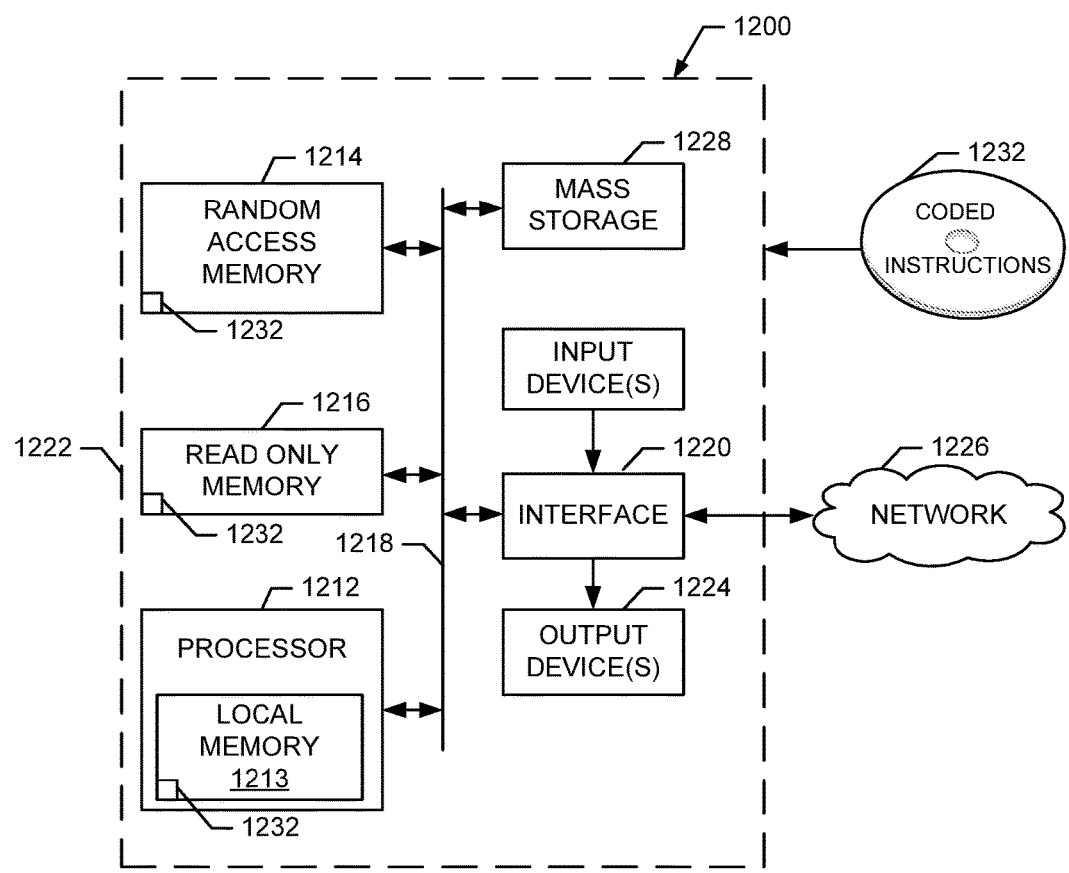
FIG. 12 is a block diagram of an example processor platform capable of executing the instructions of FIGS. 8-10 and/or 11 to implement the log processor of FIGS. 1 and/or 2, the media receivers of FIGS. 1 and/or 3, or the example media providers of FIGS. 1 and/or 4.

FIG. 12 is a block diagram of an example processor platform 1200 capable of executing the instructions of FIGS. 8-11 to implement the log processor 102 of FIG. 2, the media receiver 300 of FIG. 3, and/or the media provider 400 of FIG. 4. The computer 1200 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the instant example includes a processor 1212. For example, the processor 1212 can be implemented by one or more microprocessors or controllers from any desired family or manufacturer.

The processor 1212 includes a local memory 1213 (e.g., a cache) and is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, isopoint and/or a voice recognition system.

One or more output devices 1224 are also connected to the interface circuit 1220. The output devices 1224 can be implemented, for example, by display devices (e.g., a liquid crystal display, a cathode ray tube display (CRT), a printer and/or speakers). The interface circuit 1220, thus, typically includes a graphics driver card.

The interface circuit 1220 also includes a communication device such as a modem, a wireless communication adapter, or network interface card to facilitate exchange of data with external computers via a network 1226 (e.g., an Ethernet connection, a wireless local area network connection, a wireless wide area network connection, a digital subscriber line (DSL), a telephone line, coaxial cable, a cellular telephone system, etc.).

The processor platform 1200 also includes one or more mass storage devices 1228 for storing software and data. Examples of such mass storage devices 1228 include floppy disk drives, hard drive disks, compact disk drives and digital versatile disk (DVD) drives. The mass storage device 1228 may implement any of the log database 208 of FIG. 2, the media receiver log database 310 of FIG. 3, and/or the media provider log database 412 of FIG. 4.

The coded instructions 1232 of FIGS. 8-11 may be stored in the mass storage device 1228, in the volatile memory 1214, in the non-volatile memory 1216, and/or on a removable storage medium such as a CD or DVD.

From the foregoing, it will be appreciated that above disclosed methods, apparatus and articles of manufacture may be advantageously used to accurately and precisely identify media delivered to and/or presented by media devices. Disclosed methods, apparatus and articles of manufacture enable the differentiation of devices of the same type and/or having identical characteristics. Furthermore, disclosed methods, apparatus and articles of manufacture enable the differentiation of devices located on the same local area network and the identification of media delivered to and/or presented by each co-located device. Disclosed methods, apparatus, and articles of manufacture provided heightened privacy and/or anonymity for panelists and/or users of monitored media receivers. Methods, apparatus, and articles of manufacture disclosed herein enable a high granularity of audience measurement for media providers when media identification is used in conjunction with geodemographic information that can be supplied by an audience measurement service provider.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to identify media delivered to media receivers, the method comprising:
providing, by executing an instruction with a processor, a media monitor to a media presentation device after a selection of a user of the media presentation device as a participant in an audience measurement panel, the media monitor to generate a media log entry including first source address information, first destination address information, first source port information, first destination port information, and media identification information associated with a media receiving event in response to detection of the media receiving event;
processing, by executing an instruction with the processor, a first log file received from the media monitor that includes the media log entry;
determining, by executing an instruction with the processor, if the media log entry corresponds to a reference log entry from a media provider;
in response to detecting the corresponding reference log entry, storing by executing an instruction with the processor, in memory, the media identification information from the media log entry in association with the media presentation device;
generating, by executing an instruction with the processor, an exposure report that associates media identified in the media information with the media provider that provided the media to the media presentation device.

2. The method of claim 1, wherein determining if the media log entry corresponds to the reference log entry further includes comparing, by executing an instruction with the processor, information in the media log entry to the corresponding reference log entry to identify a matching entry between the media provider and media presentation device, the reference log entry including second source address information, second destination address information, second source port information, and second destination port information.

3. The method of claim 1, wherein the reference log entry is included in a reference log that includes a plurality of reference log entries representative of connections with a plurality of media presentation devices.

4. The method of claim 1, wherein the first log file includes a plurality of media log entries representative of connections with one or more media providers.

5. The method of claim 1, wherein the first source address information, the first destination address information, the first source port information, and the first destination port information are based on a packet transmitted from the media provider to the media presentation devices.

6. The method of claim 5, wherein the packet includes media.

7. The method of claim 1, wherein the media log entry includes a first timestamp, the reference log entry includes a second timestamp, and the determining if the media log entry corresponds to a reference log entry includes comparing the first and second timestamps.

8. A tangible machine readable storage medium comprising machine readable instructions which, when executed, cause a machine to at least:
provide a media monitor to a media presentation device after a selection of a user of the media presentation device as a participant in an audience measurement panel, the media monitor to generate a media log entry including first source address information, first destination address information, first source port information, first destination port information, and media identification information associated with a media receiving event in response to detection of the media receiving event;
process a first log file received from the media monitor that includes the media log entry;
determine if the media log entry corresponds to a reference log entry from a media provider;
in response to detecting the corresponding reference log entry, store the media identification information from the media log entry in association with the media monitor;
generate an exposure report that associates media identified in the media information with the media provider that provided the media to the media presentation device.

9. The tangible machine readable storage medium of claim 8, wherein determining if the media log entry corresponds to the reference log entry further includes comparing information in the media log entry to the corresponding reference log entry to identify a matching entry between the media provider and media presentation device, the reference log entry including second source address information, second destination address information, second source port information, and second destination port information.

10. The tangible machine readable storage medium of claim 8, wherein the reference log entry is included in a reference log that includes a plurality of reference log entries representative of connections with a plurality of media presentation devices.

11. The tangible machine readable storage medium of claim 8, wherein the first log file includes a plurality of media log entries representative of connections with one or more media providers.

12. The tangible machine readable storage medium of claim 8, wherein the first source address information, the first destination address information, the first source port information, and the first destination port information are based on a packet transmitted from the media provider to the media presentation devices.

13. The tangible machine readable storage medium of claim 12, wherein the packet includes media.

14. The tangible machine readable storage medium of claim 8, wherein the media log entry includes a first timestamp, the reference log entry includes a second timestamp, and the instructions, when executed, cause the machine to determine if the media log entry corresponds to the reference log entry by comparing the first and second timestamps.

15. An apparatus to identify media delivered to media receivers, the apparatus comprising:
a processor;
memory comprising machine readable instructions which, when executed by the processor, cause the processor to at least:
provide a media monitor to a media presentation device after a selection of a user of the media presentation device as a participant in an audience measurement panel, the media monitor to generate a media log entry including first source address information, first destination address information, first source port information, first destination port information, and media identification information associated with a media receiving event in response to detection of the media receiving event;

a log collector to receive a first log file from the media monitor that includes the media log entry;

a log entry matcher to determining if the media log entry corresponds to a reference log entry from a media provider;

a media logger to store an identification of media from the media log entry in association with the media presentation device in response to the log entry matcher identifying a match;

an exposure report generator to generate an exposure report that associates media identified in the media information with the media provider that provided the media to the media presentation device.

16. The apparatus as defined in claim 15, wherein the media monitor is provided to the media presentation device through at least one of an application store or a software update.

17. The apparatus as defined in claim 15, wherein the log entry matcher is to identify the match between the media log entry and the reference log entry based on matching timestamps.

18. The apparatus as defined in claim 15, wherein the log entry matcher is to identify the match between the media log entry and the reference log entry based on the source address information, the destination address information, the source port information, and the destination port information.

19. The apparatus as defined in claim 15, wherein the first source address information, the first destination address information, the first source port information, and the first destination port information are based on a packet transmitted from the media provider to the media presentation devices.

20. The apparatus as defined in claim 19, wherein the packet includes media.

* * * * *